United States Patent
McMahon

(10) Patent No.: US 7,298,107 B2
(45) Date of Patent: Nov. 20, 2007

(54) BARRIER OPERATOR CONTROLLER WITH USER ADJUSTABLE FORCE SETPOINT

(75) Inventor: Michael T. McMahon, Salem, OH (US)

(73) Assignee: Overhead Door Corporation, Lewisville, TX (US)

( * ) Notice: Subject to any disclaimer, the term of this patent is extended or adjusted under 35 U.S.C. 154(b) by 0 days.

(21) Appl. No.: 11/356,268

(22) Filed: Feb. 16, 2006

(65) Prior Publication Data

US 2006/0138987 A1 Jun. 29, 2006

Related U.S. Application Data

(63) Continuation of application No. 11/005,355, filed on Dec. 6, 2004, now Pat. No. 7,034,486.

(51) Int. Cl.
*H02P 7/00* (2006.01)
(52) U.S. Cl. ............... 318/466; 318/445; 318/362; 318/366; 318/430; 318/434; 318/266; 318/257
(58) Field of Classification Search ........... 318/466, 318/445, 362, 366, 286, 369, 430, 434, 266, 318/257
See application file for complete search history.

(56) References Cited

U.S. PATENT DOCUMENTS

| | | | | |
|---|---|---|---|---|
| 4,638,433 | A * | 1/1987 | Schindler | 700/90 |
| 5,218,282 | A | 6/1993 | Duhame | |
| 5,278,480 | A * | 1/1994 | Murray | 318/626 |
| 5,770,934 | A * | 6/1998 | Theile | 318/469 |
| 5,789,887 | A * | 8/1998 | Elischewski | 318/468 |
| 6,118,243 | A | 9/2000 | Reed et al. | |
| 6,246,196 | B1 * | 6/2001 | Fitzgibbon et al. | 318/430 |
| 6,528,961 | B1 * | 3/2003 | Fitzgibbon et al. | 318/283 |
| 6,605,910 | B2 * | 8/2003 | Mullet et al. | 318/264 |
| 6,897,630 | B2 * | 5/2005 | Murray et al. | 318/434 |
| 2001/0024094 | A1 * | 9/2001 | Fitzgibbon et al. | 318/445 |
| 2001/0024095 | A1 * | 9/2001 | Fitzgibbon et al. | 318/480 |
| 2001/0038272 | A1 * | 11/2001 | Fitzgibbon et al. | 318/565 |
| 2002/0033683 | A1 * | 3/2002 | Fitzgibbon et al. | 318/430 |
| 2003/0192254 | A1 * | 10/2003 | Brookbank et al. | 49/199 |
| 2003/0210005 | A1 | 11/2003 | Murray | |
| 2004/0056621 | A1 * | 3/2004 | Fitzgibbon et al. | 318/445 |
| 2004/0164693 | A1 | 8/2004 | Murray et al. | |
| 2004/0239269 | A1 * | 12/2004 | Fitzgibbon et al. | 318/366 |
| 2004/0261317 | A1 | 12/2004 | Murray | |

* cited by examiner

*Primary Examiner*—Rita Leykin
(74) *Attorney, Agent, or Firm*—Gardere Wynne Sewell LLP

(57) ABSTRACT

A control unit for a moveable barrier, such as a garage door, includes a microcontroller connected to a motor speed detector, motor current sensor or a sensor for determining forces exerted on or by the barrier. A user interface includes user actuatable switches for setting a first maximum force value to be exerted on or by the barrier when moving in one direction and the microcontroller automatically sets the value of a second maximum force to be exerted on or by the barrier when moving in the opposite direction. The second force value may be based on the force value set by the user or the second force value may be a preset value. Both force limits may be automatically set as a function of a maximum force exerted on said barrier during movement thereof, during a force learning operation.

11 Claims, 1 Drawing Sheet

BARRIER OPERATOR CONTROLLER WITH USER ADJUSTABLE FORCE SETPOINT

CROSS REFERENCE TO RELATED APPLICATION

This application is a continuation of application Ser. No. 11/005,355, filed Dec. 6, 2004, now U.S. Pat. No. 7,034,486, issued Apr. 24, 2006.

BACKGROUND OF THE INVENTION

Motor driven operators for garage doors and other barriers have been developed which have the capability of controlling movement of the door to limit the door closing force in the event that an obstruction is disposed in the door movement path. Various types of operator controllers have been developed. U.S. Pat. No. 5,218,282 to Duhame discloses, for example, a garage door operator controller which senses the speed of the operator motor and utilizes speed change to indicate when motor torque, and thus the door closing force, exceeds a predetermined value. The user may adjust the door closing force and opening force by setting a speed sensor signal value, which correlates with motor torque and thus force exerted by the door, to predetermined limits to prevent damage to the door, the operator or an object in the path of movement of the door or barrier.

Other types of force sensing door operators have been developed including that disclosed and claimed in U.S. Pat. No. 6,118,243 to Reed et al. and assigned to the assignee of the present invention. The operator controller disclosed in the Reed et al. patent senses a change in current supplied to the operator electric motor which is correlated with motor torque and the force exerted by the operator on the door. User adjustable opening and closing force limits are provided which set the maximum motor current at which a signal is provided to effect stopping and reversing the operator motor, if the door is moving in the closed direction, and at least stopping the motor if the door is moving in the opening direction. However, the complexity of setting two limits by the typical barrier operator user may result in malfunctioning of the operator and frustration on the part of the user in setting the limits. Simplification of user settable controls is desirable for certain consumer products, including products such as residential garage door operators. Accordingly, there has been a need and desire to simplify user settable controls for barrier operators including, in particular, residential garage door operators. It is to these ends that the present invention has been developed.

SUMMARY OF THE INVENTION

The present invention provides an improved barrier operator control unit wherein the user may set the maximum door (barrier) closing force or opening force and whereby the opposite (either opening force or closing force) setpoint is automatically set as a function of setting the opening or closing force setpoint.

The present invention also provides a door operator including a control unit which may be controlled by the user to set either the door opening force setpoint, or closing force setpoint, or cause both setpoints to be automatically determined. The maximum force setpoint for movement of the door or barrier in one direction may be a constant incremental value greater than or less than the setpoint which is selectable by the user. Alternatively, the maximum force setpoints may be automatically set at an incremental value greater than the maximum force exerted on the door/barrier when moving between open and closed positions. For example, the barrier or door opening force setpoint may be equal to the door closing force setpoint plus a constant incremental value greater than the door closing force setpoint. These force setpoint values may be correlated with operator motor speed, electrical current applied to the motor or a force sensor, such as a strain gauge or force transducer, operably associated with the barrier and/or the barrier operator. The force transducer may also be a so-called torque transducer or sensor. Still further, the door opening force setpoint may be equal to the value of the door closing force setpoint plus a constant plus a further constant including some fraction of the door closing force setpoint. Other mathematical functions may be implemented relating to the barrier opening or closing force setpoint with respect to the other setpoint. Accordingly, the user may select one setpoint and the other setpoint is automatically determined thus simplifying user interface operation during setup of the operator or adjustment thereof.

Still further, in accordance with the invention, it is contemplated that a barrier operator control unit may be provided which includes a user adjustable setpoint for setting a maximum closing force of the barrier while the maximum opening force is preset at a constant value. Accordingly, less complicated user relationships are required for the door operator control unit and methods in accordance with the invention.

Those skilled in the art will recognize and further appreciate the above-mentioned advantages and superior features of the invention, together with other important aspects thereof, upon reading the detailed description which follows in conjunction with the drawing.

DETAILED DESCRIPTION OF THE PREFERRED EMBODIMENTS

Figure 1:
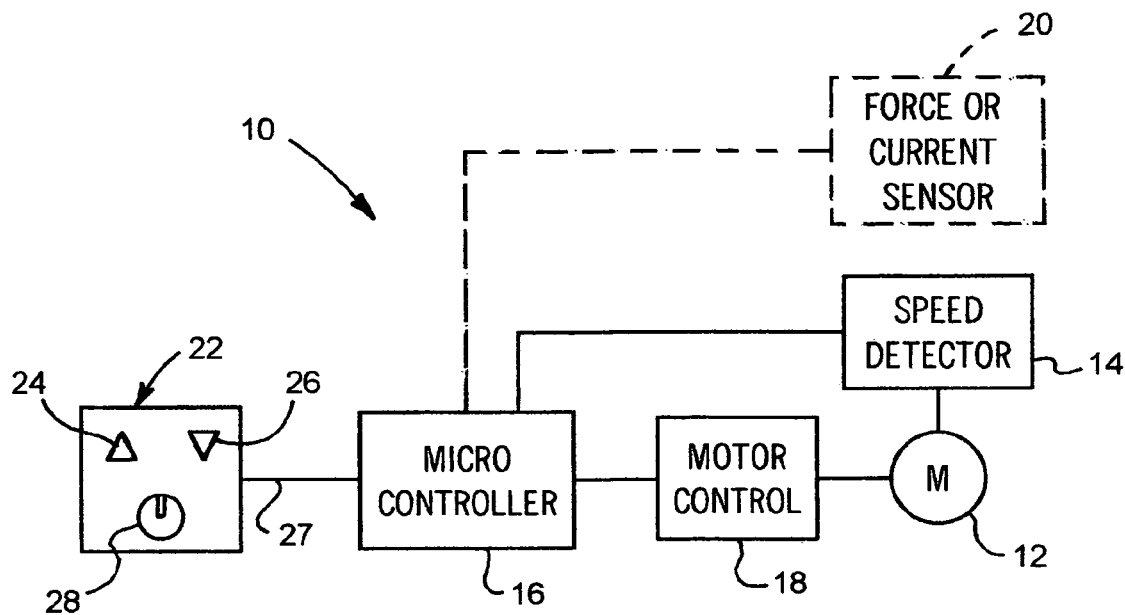
FIG. 1 is a schematic diagram of a barrier operator control unit in accordance with the invention.

In the description which follows, like elements are marked throughout the specification and drawing with the same reference numerals, respectively. The drawing figures are not to scale and certain elements are shown in somewhat generalized schematic form in the interest of clarity and conciseness. U.S. Pat. No. 6,118,243 issued Sep. 12, 2000 to Reed et al. is hereby incorporated by reference in this application.

Referring to FIG. 1, there is illustrated a generalized schematic diagram of a barrier operator control unit in accordance with the invention and generally designated by the numeral 10. The operator control unit 10 includes a motor 12, which may be of a type described in U.S. Pat. No. 6,118,243, and operably connected to a motor speed detector 14 also of a type described in the aforementioned patent. A suitable digital processor or microcontroller 16 is operable to control operation of the motor through a motor control circuit 18 and to receive signals indicating motor speed from speed detector 14. Alternatively, a suitable barrier force or motor current sensor 20 may be associated with the motor 12, and the door operator driven thereby, to provide a signal to controller 16 which is related to a force exerted by the barrier when moving between open and closed positions.

For example, if motor speed is detected, electric motors typically generate a torque which is related to speed and if resistance to motor driving torque is encountered, speed will decrease and such speed change may be sensed to determine when a maximum barrier force is being exerted or would be exerted on an obstruction in the path of movement of the barrier. In like manner, as described in U.S. Pat. No. 6,118,243, there is a correlation between electrical current supplied to motor 12 and the motor torque or effort being imposed on the barrier operator and the barrier, and such current may be sensed and used as a signal to control operation of the motor. Still further, a force sensor including a strain gauge or other type of force transducer, may be associated with the door operator, such as the operator described in U.S. Pat. No. 6,118,243, to provide a signal to the controller 16 to indicate when an obstruction is being encountered if the barrier (door) is moving to a closed position or an open position or if some fault in the door guide structure is being experienced or encountered, for example. In this way, the control unit 10 may operate to cause the motor 12 to reverse and drive the barrier in the opposite direction, for example, or simply shut off to prevent a catastrophic event. Typically, for barriers such as residential garage doors, if the door is moving in the direction to close and an obstruction is encountered, the increase in motor torque resulting from a speed decrease or increased current flow can be sensed to cause the motor control unit to stop the motor and reverse its direction to move the barrier to an open position. If the barrier is moving toward an open position and an obstruction is encountered, the motor 12 may be controlled to simply shut off. The actual forces may be measured by strain gauges or other force or torque transducers associated with the door operator mechanism to provide a signal, a limiting value of which may be utilized by the microcontroller 16 to effect operation of the motor 12, as desired.

Referring further to FIG. 1, the operator control unit 10 includes a user interface circuit 22 which may include suitable user operable pushbutton or momentary switches 24 and 26 for controlling operation of a barrier connected to the motor 12 to move between open and closed positions. The user interface circuit 22 is connected to microcontroller 16 by a suitable communication link 27, and also includes a user operable force limit setting device 28 whereby, for example, the maximum torque exerted by the motor 12 may be set by the user and which is correlated with motor speed decrease which will provide a signal to the controller 16 and motor control circuit 18. The user setting device 28 may be, for example, a rotary potentiometer or the like which changes a voltage and/or current signal supplied to the microcontroller 16 through a suitable converter circuit, if needed, as a limit value corresponding to a speed signal detected by the speed detector 14.

Accordingly, when the control unit 10 is controlling operation of the motor 12 to move a barrier, such as a garage door, to the closed position, the speed detector 14 is constantly monitoring the motor speed and, if motor speed drops below a predetermined value, for example, correlated with a increase in motor torque and force exerted by the door, the controller 10 will cause the motor 12 to cease operation and then reverse. This type of barrier operator operation is disclosed in U.S. Pat. No. 5,218,282 and the patent incorporated by reference herein.

In accordance with the present invention when a user adjusts the device 26 to set the maximum motor torque or door closing force value at the microcontroller 16, then the maximum door opening motor torque or force value is also automatically set. For example, if the user sets the door closing force setpoint then the door opening force setpoint is set at a value equal to the door closing force setpoint plus a constant K. Typically, the motor torque (and current) required for opening an upward acting garage door, for example, is greater than required for closing the door, so the constant K could be a positive value. Moreover, the door opening force setpoint value could be determined from a more complex function, such as being equal to the closing force setpoint value plus the constant K plus an incremental value, such as one-half the value of the closing force setpoint, for example. Alternatively, the manipulation of the user setpoint device 28 could result in setting the value of the motor torque limit in the barrier or door opening direction which would automatically then set the limit torque value to be exerted by the motor in the door closing direction. Still further, the door opening force setpoint value for a given operator and a given door, taking into account door weight and travel distance, could be a predetermined value which is not set automatically as a function of the closing setpoint value. In other words, with such an arrangement, the user would be able to set the door maximum closing force setpoint and the microcontroller 16 would have a preset value of door opening force setpoint already programmed therein.

Figure 2:
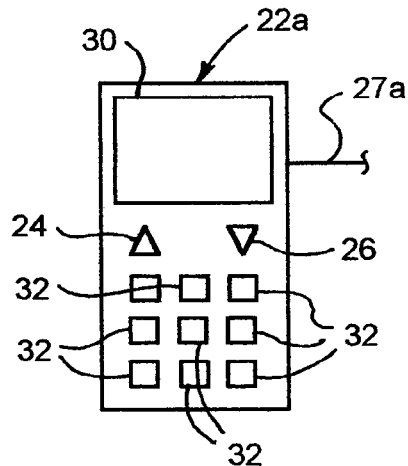
FIG. 2 is a diagram illustrating a first alternate embodiment of a portion of the control unit illustrated in FIG. 1.

The user interface 22 may take various forms. For example, as shown in FIG. 2, an alternate embodiment of a user interface is illustrated and designated by the numeral 22*a*. The user interface 22*a* may include a visual display 30, door directional operating pushbutton switches 24 and 26, and a keypad including plural pushbutton "keys" or switches 32. The user interface 22*a*, when connected to the microcontroller 16, via a communication link 27*a*, in place of the link 27, may be operable to set a value of the door (barrier) opening or closing torque which would be displayed by the display 30. Simple numeric values may be utilized to indicate the relative maximum motor torque settable by the user through the interface 22*a*.

Figure 3:
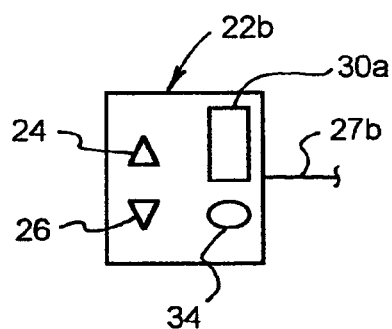
FIG. 3 is a diagram illustrating a second alternate embodiment of a portion of the control unit illustrated in FIG. 1.

Still further, the user interface may take a configuration, as illustrated in FIG. 3, wherein a user interface 22*b* is provided and is adapted to be connected to the microcontroller 16 via a communications link 27*b* in place of the communications link or channel 27. User interface 22*b* includes door opening and closing pushbutton switches 24 and 26, a visual display 30*a* and a user operable push button switch 34 which may be manipulated in such a way as to set the door closing force setpoint or door opening force setpoint and which action automatically sets the limiting force value in the other direction of movement of the door.

By way of example, the operator control unit 10 may be placed in a force learning cycle mode wherein, during operation of the motor 12 to move the barrier or door between an open and closed position, the microcontroller 16 learns the force required to open and close the door through signals related to speed of the motor, current applied to the motor or a force value sensed by a suitable force sensor. Accordingly, a user of the operator control unit 10, starting with the barrier or door in the closed position, may initiate a force learning cycle by pushing and holding the pushbutton switch 24 until the door reaches the open limit position. This would establish a force profile measured by the microcontroller 16. The force profile in the door closing direction could be generated by pushing and holding the pushbutton switch 26 in the closed position until the door reaches the closed limit position which would establish the force or motor torque profile in the barrier or door closing direction. The device 28 would be placed in a zero or minimum force setting position prior to actuation of the switches 24 and 26.

Upon completion of establishing the force or torque profiles in the barrier opening and closing directions, the user could set a maximum closing force or torque value by adjusting the position of the device 28, which action would automatically set the barrier closing force limit at a value greater than the maximum force established in the force profile established during the previous operations and such setting would also automatically set the door opening force or torque limit at which the microcontroller 16 would effect shutoff of the motor 12. However, as mentioned previously, the maximum door opening force or torque value could also be preset in the microcontroller 16 in the control unit 10 unless the user is only setting the maximum closing force or torque value which the motor 12 can exert. The controller 16 of control unit 10 would also preferably be preprogrammed to automatically limit the maximum force or torque value that could be set by the user at the interface 22 which would be a value that would prevent injury to a person trapped by the door or barrier as it approached its final closed position. However, for an upward acting garage door, for example, it is preferable to allow the user to set door closing force limits to correct for changes in the position of the garage floor, or accumulations of snow or ice thereon, for example. Thus, the user should be allowed to adjust the control unit 10 to prevent the door from unwanted stopping and reversal at or near the closed limit position.

The operation of interface 22a in place of interface 22 would be similar to that just described except that the keypad 32 may be used to enter numerical values of increased or decreased force or torque settings which would be displayed on display 30. For example, after completion of the force learning cycle described above, upon actuation of one of the key switches 32, the maximum recorded closing force value may be displayed on the display 30 after which the closing force or torque limit may be increased by pressing one or more of the key switches 32. Switches 32 may also be used for other purposes during normal use of the interface 22a, such as inputting user identification codes for a keyless entry system or the like, for example.

Use of the user interface 22b in place of the user interface 22 would also follow, generally, the force learning cycle process and force or torque limit setting process in accordance with the invention. For example, after establishing the force or torque learning cycle in both the opening and closing direction of a barrier controlled by the operator control unit 10, the opening or closing force limit value would be set by pressing the pushbutton switch 34, for example, a predetermined number of times until a numerical value appears in the display 30a. Pushbutton switch 34 may then be actuated until another predetermined numerical value appears in the display 30a showing the set value of the opening or closing force limit. The force limit value in either the opening or closing direction may then be increased or decreased by actuation of the pushbutton switches 24 or 26 and, after setting a value of the opening or closing force limit, the switch 34 may be actuated again to establish that value in the microcontroller 16 and the force limit in the opposite direction of movement of the door would then automatically be set as a consequence of setting of only one force limit by the user of the interface 22b.

The present invention also contemplates an operator control unit and method wherein the microcontroller 16 would be programmed to automatically set the force limits in either the opening or closing direction, or both, upon initiation of movement of the barrier during a force learning cycle from the barrier open position to the barrier closed position or vice versa. For example, a force learning process could be initiated by actuation of one of the pushbutton switches, such as the pushbutton switch 26 of one of the user interfaces 22, 22a or 22b, to establish the force or torque profile in the barrier closing direction. During movement of the barrier from the open position to the closed position, the forces exerted on the barrier by the operator motor 12 of control unit 10 would be recorded by microcontroller 16 and the maximum force setpoint in the closing direction would then be selected by the microcontroller to be a value a predetermined amount greater than the maximum force recorded during movement of the barrier during the force learning cycle.

Additionally, the microcontroller 16 would be programmed to also automatically set the maximum force value to be exerted on or by the barrier when moving in the barrier opening direction as a function of the maximum force value set by the microcontroller for movement of the barrier in the closing direction. This procedure could, of course, be reversed in the sense that the barrier could be moved from the closed position to the open position, the maximum force exerted on the barrier would be sensed and values of maximum forces to be exerted on or by the barrier could then be automatically set by the microcontroller 16 for movement of the barrier in both the opening direction and the closing direction. This process may require calibration from time to time if the maximum force encountered by the barrier when moving between open and closed positions should increase to a point which would exceed the barrier maximum closing force setpoint or the barrier maximum opening force setpoint.

Operation of the user interfaces 22, 22a and 22b includes the requirement of actuating pushbutton switches 24 and 26 for controlling movement of the barrier associated with the control unit 10 in the opening direction or the closing direction, respectively. A single pushbutton switch could replace the pushbutton switches 24 and 26 and which would be actuatable in sequence to first open the barrier, then close the barrier, as will be appreciated by those skilled in the art.

Preferred embodiments of the invention have been described in detail hereinabove. Those skilled in the art will recognize that various substitutions and modifications may be made without departing from the scope and spirit of the appended claims.

What is claimed is:

1. In an operator for a barrier moveable between open and closed positions, said operator including a motor, a control unit for controlling operation of said motor, a sensor for sensing a parameter which corresponds to a force exerted by said barrier when moving between open and closed positions, a motor control circuit for controlling operation of said motor, a controller in communication with said motor control circuit and said sensor and a user interface operably connected to said controller including user controllable means for setting a first force limit to be exerted by said barrier when moving in one direction between said open and closed positions, the method including the steps:

operating said user interface by a user of said operator to set a user selected first force limit to be exerted by said barrier when moving between said open and closed positions in said one direction; and causing said controller to automatically set a second force limit to be exerted by said barrier when moving in the opposite direction after operating said user interface to set said first force limit.

2. The method set forth in claim 1 including the steps of:
causing said operator to move said door between a closed position and an open position and recording a force profile based on sensing said parameter prior to setting said first force limit.

3. The method set forth in claim 2 including the steps of:
observing a first value related to the maximum force sensed during establishment of said profile; and
setting said first force limit at a second value greater than said first value related to said maximum force observed.

4. The method set forth in claim 1 including the step of:
sensing motor speed as said parameter.

5. The method set forth in claim 1 including the step of:
sensing electrical current supplied to said motor as said parameter.

6. The method set forth in claim 1 including the step of:
sensing one of a force or torque as said parameter.

7. The method set forth in claim 1 including the step of:
presetting said second force limit in said controller prior to setting said first force limit.

8. In an operator for a barrier moveable between open and closed positions, a motor and a control unit for controlling operation of said motor, said control unit comprising:
means for sensing a parameter which corresponds to a force exerted by said operator on said barrier when moving between open and closed positions;
a motor control circuit for controlling operation of said motor;
a controller in communication with said motor control circuit and said means for sensing said parameter; and
a user interface operably connected to said controller, said user interface and said controller being operable for causing one of automatically setting barrier closing and opening force limits and user setting of a first force limit to be exerted by said barrier when moving between said open and closed positions in one direction whereby setting said first force limit by said user is followed by said control unit automatically setting a second force limit to be exerted by said barrier when said barrier is moving in a direction opposite said one direction.

9. The control unit set forth in claim 8 wherein:
said user interface includes a visual display and switch means operable by a user of said control unit to input said first force limit to be exerted by said barrier when moving in said one direction.

10. The control unit set forth in claim 9 wherein:
said controller is operable to set said second force limit in the opposite direction of movement of said barrier by one of adding a constant to said first force limit and subtracting a constant from said first force limit.

11. The control unit set forth in claim 10 wherein:
said means for sensing said parameter comprises one of a motor speed detector, a force sensor and a torque sensor.

* * * * *